United States Patent
Stallmo

[19]

[11] Patent Number: 6,154,854
[45] Date of Patent: *Nov. 28, 2000

[54] LOGICAL PARTITIONING OF A REDUNDANT ARRAY STORAGE SYSTEM

[75] Inventor: David Charles Stallmo, Boulder, Colo.

[73] Assignee: EMC Corporation, Hopkinton, Mass.

[*] Notice: This patent is subject to a terminal disclaimer.

[21] Appl. No.: 09/004,671

[22] Filed: Jan. 8, 1998

Related U.S. Application Data

[63] Continuation of application No. 08/635,205, Apr. 17, 1996, Pat. No. 5,708,769, which is a continuation of application No. 08/215,013, Mar. 21, 1994, Pat. No. 5,519,844, which is a continuation of application No. 07/612,220, Nov. 9, 1990, abandoned.

[51] Int. Cl.[7] .............................. G06F 11/10; G06F 12/16
[52] U.S. Cl. ................................................. 714/6; 711/114
[58] Field of Search .............................. 714/6, 7; 711/114

[56] References Cited

U.S. PATENT DOCUMENTS

| | | | |
|---|---|---|---|
| 3,893,178 | 7/1975 | Sordello | 360/73 |
| 4,092,732 | 5/1978 | Ouchi | 364/900 |
| 4,467,421 | 8/1984 | White | 364/200 |

(List continued on next page.)

FOREIGN PATENT DOCUMENTS

| | | | |
|---|---|---|---|
| 2-236714 | 9/1990 | Japan | G06F 3/08 |
| WO 91/13404 | 9/1991 | WIPO . | |

OTHER PUBLICATIONS

Patterson, D.A., Gibson, G., and Katz, H., "A Case for Redundant Arrays of Inexpensive Disks (RAID)" ACM Sigmod Conf., Jun. 1–3, 1988, pp. 109–116.

Lee, E.K., "Software and Performance Issues in the Implementation of a RAID Prototype (May 1990)".

Chen, P., Gibson, G., Katz, R.H., Patterson, D.A. and Schulze, M., Introduction to Redundant Arrays of Inexpensive Disks (RAID), Compcon Spring 1989.

Chen, P., Gibson, G., Katz, R.H., Patterson, D.A., and Schulze, M., et al., "Evolution of the Raid 2 Architecture" (Jun. 12, 1990).

Maximum Strategy, Inc. San Jose, CA, "Strategy 2 Disk Array Controller Operation Manual," (Nov. 2, 1998).

(List continued on next page.)

*Primary Examiner*—Stephen M. Baker
*Attorney, Agent, or Firm*—Howrey Simon Arnold & White LLP

[57] ABSTRACT

A redundant array storage system that can be configured as a RAID 1, 3, 4, or 5 system, or any combination of these configurations. The invention comprises a configuration data structure for addressing a redundant array storage system, and a method for configuring a redundant array storage system during an initialization process. The redundant array storage system comprises a set of physical storage units which are accessible in terms of block numbers. The physical storage units are each configured as one or more logical storage units. Each logical storage unit is addressed in terms of a channel number, storage unit number, starting block number, offset number, and number of blocks to be transferred. Once logical storage units are defined, logical volumes are defined as one or more logical storage units, each logical volume having a depth characteristic. After the logical volumes are defined, redundancy groups are defined as one or more logical volumes. A redundancy level is specified for each redundancy group. The redundancy level may be none, one, or two. Logical volumes are addressed by a host CPU by volume number, initial block number, and number of blocks to be transferred. The host CPU also specifies a READ or WRITE operation. The specified volume number, initial block number, and number of blocks to be transferred are then translated into a corresponding channel number, storage unit number, starting block number, offset number, and number of blocks to be transferred. With the present invention, it is possible for a logical volume to span across physical storage units ("vertical partitioning"), comprise only a portion of each such physical storage unit ("horizontal partitioning"), and have definable depth and redundancy characteristics.

13 Claims, 6 Drawing Sheets

U.S. PATENT DOCUMENTS

| | | | |
|---|---|---|---|
| 4,562,576 | 12/1985 | Ratcliffe | 371/21 |
| 4,607,346 | 8/1986 | Hill | 364/900 |
| 4,667,326 | 5/1987 | Young et al. | 371/40 |
| 4,722,085 | 1/1988 | Flora et al. | 371/38 |
| 4,754,397 | 6/1988 | Varaiva et al. | 364/200 |
| 4,761,785 | 8/1988 | Clark et al. | 371/51 |
| 4,768,193 | 8/1988 | Takemae | 371/10 |
| 4,775,978 | 10/1988 | Hartness | 371/38 |
| 4,817,035 | 3/1989 | Timsit | 364/900 |
| 4,819,159 | 4/1989 | Shipley et al. | 364/200 |
| 4,849,929 | 7/1989 | Timsit | 364/900 |
| 4,870,643 | 9/1989 | Bultman et al. | 371/11.1 |
| 4,899,342 | 2/1990 | Potter et al. | 371/10.1 |
| 4,914,656 | 4/1990 | Dunphy, Jr. et al. | 371/10.2 |
| 4,942,579 | 7/1990 | Goodlander et al. | 371/51 |
| 4,989,206 | 1/1991 | Dunphy, Jr. et al. | 371/10.1 |
| 4,993,030 | 2/1991 | Krakauer et al. | 371/40.1 |
| 5,073,854 | 12/1991 | Martin et al. | 364/425 |
| 5,088,081 | 2/1992 | Farr | 369/54 |
| 5,124,987 | 6/1992 | Milligan et al. | 371/10.1 |
| 5,129,088 | 7/1992 | Auslander | 395/700 |
| 5,130,992 | 7/1992 | Frey, Jr. et al. | 371/40.1 |
| 5,134,619 | 7/1992 | Hensen et al. | 371/40.3 |
| 5,140,592 | 8/1992 | Idleman et al. | 371/8.1 |
| 5,148,432 | 9/1992 | Gordon et al. | 371/10.1 |
| 5,155,845 | 10/1992 | Beal et al. | 395/575 |
| 5,166,939 | 11/1992 | Jaffe et al. | 371/40.1 |
| 5,193,184 | 3/1993 | Belsan et al. | 395/600 |
| 5,210,866 | 5/1993 | Milligan et al. | 395/575 |
| 5,287,453 | 2/1994 | Roberts | 395/200 |
| 5,440,716 | 8/1995 | Schultz et al. | 395/441 |
| 5,519,844 | 5/1996 | Stallmo | 395/441 |
| 5,708,769 | 1/1998 | Stallmo | 395/182.04 |

OTHER PUBLICATIONS

Maximum Strategy, Inc., San Jose, CA, "Strategy 1 Disk Array Controller Operation Manual," (Date Unknown).

Gibson, G. A., "Performance and Reliability in Redundant Arrays of Inexpensive Disks," (Date Unknown).

Chen, P., "An Evaluation of Redundant Arrays of Disks Using an Amdahl 5890," (May 1989).

Katz, R. H., Gibson, G. A., and Patterson, D. A., "Disk System Architectures for High Performance Computing," (Mar. 1989).

Gray, J., Horst, B., and Walker, M., "Parity Striping of Disc Arrays: Low–Cost Reliable Storage with Acceptable Throughtput," (Jan. 1990).

Schultz, M. E., "Considerations in the Design of a Raid Prototype," (Aug. 1988).

Clark, and Corrigan, IBM Systems Journal, vol. 23, No. 3, 1989, "Application System/400 Performance Characteristics," pp. 407–423.

Meador, W., "Disk Array Systems," COMCON Spring 89, Feb. 27–Mar. 3, 1989 pp. 143–146.

Schlecher, D. et al., "System Overview of the Application System/400," IBM Systems Journal, vol. 28, No. 3 pp. 360–375.

Nikkei Computer, pp. 115–120, Oct. 22, 1990.

Jeff Moad, "Relief for Slow Storage Systems," Datamation, Sep. 1, 1990, pp. 22–28.

LOGICAL VOLUME #0      LOGICAL VOLUME #1

LOGICAL STORAGE UNITS

| | S0 | S1 | S2 | S3 | S4 | S5 | S0' | S1' | S2' | S3' | S4' | S5' |
|---|---|---|---|---|---|---|---|---|---|---|---|---|
| L0 | 0 | 1 | 2 | 3 | 4 | 5 | 0 | 1 | 2 | 3 | 4 | 5 |
| L1 | 6 | 7 | 8 | 9 | 10 | 11 | 6 | 7 | 8 | 9 | 10 | 11 |
| L2 | 12 | 13 | 14 | 15 | 16 | 17 | 12 | 13 | 14 | 15 | 16 | 17 |
| L3 | 18 | 19 | 20 | 21 | 22 | 23 | 18 | 19 | 20 | 21 | 22 | 23 |
| L4 | 24 | 25 | 26 | 27 | 28 | 29 | 24 | 25 | 26 | 27 | 28 | 29 |
| L5 | 30 | 31 | 32 | 33 | 34 | 35 | 30 | 31 | 32 | 33 | 34 | 35 |
| L6 | 36 | 37 | 38 | 39 | 40 | 41 | 36 | 37 | 38 | 39 | 40 | 41 |
| L7 | 42 | 43 | 44 | 45 | 46 | 47 | 42 | 43 | 44 | 45 | 46 | 47 |

LOGICAL BLOCKS

FIG. 2D

LOGICAL VOLUME #0      LOGICAL VOLUME #1

LOGICAL STORAGE UNITS

| | S0 | S1 | S2 | S3 | S4 | S5 | S0' | S1' | S2' | S3' | S4' | S5' |
|---|---|---|---|---|---|---|---|---|---|---|---|---|
| L0 | 0 | 4 | 8 | 12 | 16 | 20 | 0 | 1 | 2 | 3 | 4 | 5 |
| L1 | 1 | 5 | 9 | 13 | 17 | 21 | 6 | 7 | 8 | 9 | 10 | 11 |
| L2 | 2 | 6 | 10 | 14 | 18 | 22 | 12 | 13 | 14 | 15 | 16 | 17 |
| L3 | 3 | 7 | 11 | 15 | 19 | 23 | 18 | 19 | 20 | 21 | 22 | 23 |
| L4 | 24 | 28 | 32 | 36 | 40 | 44 | 24 | 25 | 26 | 27 | 28 | 29 |
| L5 | 25 | 29 | 33 | 37 | 41 | 45 | 30 | 31 | 32 | 33 | 34 | 35 |
| L6 | 26 | 30 | 34 | 38 | 42 | 46 | 36 | 37 | 38 | 39 | 40 | 41 |
| L7 | 27 | 31 | 35 | 39 | 43 | 47 | 42 | 43 | 44 | 45 | 46 | 47 |

LOGICAL BLOCKS

LOGICAL VOLUME #0

LOGICAL STORAGE UNITS

|  | S0 | S1 | S2 | S3 | S4 | S5 |
|---|---|---|---|---|---|---|
| L0 | P | 0 | 1 | 2 | 3 | 4 |
| L1 | 5 | P | 6 | 7 | 8 | 9 |
| L2 | 10 | 11 | P | 12 | 13 | 14 |
| L3 | 15 | 16 | 17 | P | 18 | 19 |
| L4 | 20 | 21 | 22 | 23 | P | 24 |
| L5 | 25 | 26 | 27 | 28 | 29 | P |
| L6 | P | 30 | 31 | 32 | 33 | 34 |
| L7 | 35 | P | 36 | 37 | 38 | 39 |

LOGICAL BLOCKS

FIG. 2E

LOGICAL VOLUME #0

LOGICAL STORAGE UNITS

|  | S0 | S1 | S2 | S3 | S4 | S5 |
|---|---|---|---|---|---|---|
| L0 | P | Q | 0 | 1 | 2 | 3 |
| L1 | 4 | P | Q | 5 | 6 | 7 |
| L2 | 8 | 9 | P | Q | 10 | 11 |
| L3 | 12 | 13 | 14 | P | Q | 15 |
| L4 | 16 | 17 | 18 | 19 | P | Q |
| L5 | Q | 20 | 21 | 22 | 23 | P |
| L6 | P | Q | 24 | 25 | 26 | 27 |
| L7 | 28 | P | Q | 29 | 30 | 31 |

LOGICAL BLOCKS

FIG. 2F

| REDUNDANCY GROUP #0 | | | | |
|---|---|---|---|---|
| LOGICAL VOLUME #0 | | | | |
| LOGICAL DISK #0 | CHANNEL # | STORAGE UNIT # | STARTING BLOCK # | # OF BLOCKS |
| LOGICAL DISK #1 | CHANNEL # | STORAGE UNIT # | STARTING BLOCK # | # OF BLOCKS |
| LOGICAL DISK #2 | CHANNEL # | STORAGE UNIT # | STARTING BLOCK # | # OF BLOCKS |
| LOGICAL DISK #3 | CHANNEL # | STORAGE UNIT # | STARTING BLOCK # | # OF BLOCKS |
| LOGICAL DISK #4 | CHANNEL # | STORAGE UNIT # | STARTING BLOCK # | # OF BLOCKS |
| LOGICAL DISK #5 | CHANNEL # | STORAGE UNIT # | STARTING BLOCK # | # OF BLOCKS |
| LOGICAL VOLUME #1 | | | | |
| LOGICAL DISK #6 | CHANNEL # | STORAGE UNIT # | STARTING BLOCK # | # OF BLOCKS |
| LOGICAL DISK #7 | CHANNEL # | STORAGE UNIT # | STARTING BLOCK # | # OF BLOCKS |
| LOGICAL DISK #8 | CHANNEL # | STORAGE UNIT # | STARTING BLOCK # | # OF BLOCKS |
| LOGICAL DISK #9 | CHANNEL # | STORAGE UNIT # | STARTING BLOCK # | # OF BLOCKS |
| LOGICAL DISK #10 | CHANNEL # | STORAGE UNIT # | STARTING BLOCK # | # OF BLOCKS |
| LOGICAL DISK #11 | CHANNEL # | STORAGE UNIT # | STARTING BLOCK # | # OF BLOCKS |

FIG. 3A

| REDUNDANCY GROUP #0 | | | |
|---|---|---|---|
| LOGICAL VOLUME #0 | | | |
| LOGICAL DISK #0 | CHANNEL # | STORAGE UNIT # | STARTING BLOCK # | # OF BLOCKS |
| LOGICAL DISK #1 | CHANNEL # | STORAGE UNIT # | STARTING BLOCK # | # OF BLOCKS |
| LOGICAL DISK #2 | CHANNEL # | STORAGE UNIT # | STARTING BLOCK # | # OF BLOCKS |
| LOGICAL DISK #3 | CHANNEL # | STORAGE UNIT # | STARTING BLOCK # | # OF BLOCKS |
| LOGICAL DISK #4 | CHANNEL # | STORAGE UNIT # | STARTING BLOCK # | # OF BLOCKS |
| LOGICAL DISK #5 | CHANNEL # | STORAGE UNIT # | STARTING BLOCK # | # OF BLOCKS |

| REDUNDANCY GROUP #1 | | | |
|---|---|---|---|
| LOGICAL VOLUME #1 | | | |
| LOGICAL DISK #6 | CHANNEL # | STORAGE UNIT # | STARTING BLOCK # | # OF BLOCKS |
| LOGICAL DISK #7 | CHANNEL # | STORAGE UNIT # | STARTING BLOCK # | # OF BLOCKS |
| LOGICAL DISK #8 | CHANNEL # | STORAGE UNIT # | STARTING BLOCK # | # OF BLOCKS |
| LOGICAL DISK #9 | CHANNEL # | STORAGE UNIT # | STARTING BLOCK # | # OF BLOCKS |
| LOGICAL DISK #10 | CHANNEL # | STORAGE UNIT # | STARTING BLOCK # | # OF BLOCKS |
| LOGICAL DISK #11 | CHANNEL # | STORAGE UNIT # | STARTING BLOCK # | # OF BLOCKS |

FIG. 3B

LOGICAL PARTITIONING OF A REDUNDANT ARRAY STORAGE SYSTEM

RELATED APPLICATIONS

The present application is a continuation of co-pending U.S. patent application Ser. No. 08/635,205 entitled LOGICAL PARTITIONING OF A REDUNDANT ARRAY STORAGE SYSTEM, which was filed Apr. 17, 1996. Ser. No. 08/635,205 now U.S. Pat. No. 5,708,769 was a continuation U.S. patent application Ser. No. 08/215,013, now U.S. Pat. No. 5,519,844, which was filed Mar. 21, 1994. Ser. No. 08/215,013 was a continuation of Ser. No. 07/612,220, filed Nov. 9, 1990, and now abandoned.

BACKGROUND OF THE INVENTION

1. Field of the Invention

This invention relates to computer system data storage, and more particularly to a redundant array storage system that can be configured as a RAID 1, 3, 4, or 5 system, or any combination of these configurations.

2. Description of Related Art

A typical data processing system generally involves one or more storage units which are connected to a Central Processor Unit (CPU) either directly or through a control unit and a channel. The function of the storage units is to store data and programs which the CPU uses in performing particular data processing tasks.

Various type of storage units are used in current data processing systems. A typical system may include one or more large capacity tape units and/or disk drives (magnetic, optical, or semiconductor) connected to the system through respective control units for storing data.

However, a problem exists if one of the large capacity storage units fails such that information contained in that unit is no longer available to the system. Generally, such a failure will shut down the entire computer system.

The prior art has suggested several ways of solving the problem of providing reliable data storage. In systems where records are relatively small, it is possible to use error correcting codes which generate ECC syndrome bits that are appended to each data record within a storage unit. With such codes, it is possible to correct a small amount of data that may be read erroneously. However, such codes are generally not suitable for correcting or recreating long records which are in error, and provide no remedy at all if a complete storage unit fails. Therefore, a need exists for providing data reliability external to individual storage units.

Other approaches to such "external" reliability have been described in the art. A research group at the University of California, Berkeley, in a paper entitled "A Case for Redundant Arrays of Inexpensive Disks (RAID)", Patterson, et al., *Proc. ACM SIGMOD,* June 1988, has catalogued a number of different approaches for providing such reliability when using disk drives as storage units. Arrays of disk drives are characterized in one of five architectures, under the acronym "RAID" (for Redundant Arrays of Inexpensive Disks).

A RAID 1 architecture involves providing a duplicate set of "mirror" storage units and keeping a duplicate copy of all data on each pair of storage units. While such a solution solves the reliability problem, it doubles the cost of storage. A number of implementations of RAID 1 architectures have been made, in particular by Tandem Corporation.

A RAID 2 architecture stores each bit of each word of data, plus Error Detection and Correction (EDC) bits for each word, on separate disk drives (this is also known as "bit stripping"). For example, U.S. Pat. No. 4,722,085 to Flora et al. discloses a disk drive memory using a plurality of relatively small, independently operating disk subsystems to function as a large, high capacity disk drive having an unusually high fault tolerance and a very high data transfer bandwidth. A data organizer adds 7 EDC bits (determined using the well-known Hamming code) to each 32-bit data word to provide error detection and error correction capability. The resultant 39-bit word is written, one bit per disk drive, on to 39 disk drives. If one of the 39 disk drives fails, the remaining 38 bits of each stored 39-bit word can be used to reconstruct each 32-bit data word on a word-by-word basis as each data word is read from the disk drives, thereby obtaining fault tolerance.

An obvious drawback of such a system is the large number of disk drives required for a minimum system (since most large computers use a 32-bit word), and the relatively high ratio of drives required to store the EDC bits (7 drives out of 39). A further limitation of a RAID 2 disk drive memory system is that the individual disk actuators are operated in unison to write each data block, the bits of which are distributed over all of the disk drives. This arrangement has a high data transfer bandwidth, since each individual disk transfers part of a block of data, the net effect being that the entire block is available to the computer system much faster than if a single drive were accessing the block. This is advantageous for large data blocks. However, this arrangement also effectively provides only a single read/write head actuator for the entire storage unit. This adversely affects the random access performance of the drive array when data files are small, since only one data file at a time can be accessed by the "single" actuator. Thus, RAID 2 systems are generally not considered to be suitable for computer systems designed for On-Line Transaction Processing (OLTP), such as in banking, financial, and reservation systems, where a large number of random accesses to many small data files comprises the bulk of data storage and transfer operations.

A RAID 3 architecture is based on the concept that each disk drive storage unit has internal means for detecting a fault or data error. Therefore, it is not necessary to store extra information to detect the location of an error; a simpler form of parity-based error correction can thus be used. In this approach, the contents of all storage units subject to failure are "Exclusive OR'd" (XOR'd) to generate parity information. The resulting parity information is stored in a single redundant storage unit. If a storage unit fails, the data on that unit can be reconstructed on to a replacement storage unit by XOR'ing the data from the remaining storage units with the parity information. Such an arrangement has the advantage over the mirrored disk RAID 1 architecture in that only one additional storage unit is required for "N" storage units. A further aspect of the RAID 3 architecture is that the disk drives are operated in a coupled manner, similar to a RAID 2 system, and a single disk drive is designated as the parity unit.

One implementation of a RAID 3 architecture is the Micropolis Corporation Parallel Drive Array, Model 1804 SCSI, that uses four parallel, synchronized disk drives and one redundant parity drive. The failure of one of the four data disk drives can be remedied by the use of the parity bits stored on the parity disk drive. Another example of a RAID 3 system is described in U.S. Pat. No. 4,092,732 to Ouchi.

A RAID 3 disk drive memory system has a much lower ratio of redundancy units to data units than a RAID 2 system. However, a RAID 3 system has the same performance limitation as a RAID 2 system, in that the individual disk actuators are coupled, operating in unison. This adversely affects the random access performance of the drive array when data files are small, since only one data file at a time can be accessed by the "single" actuator. Thus, RAID 3 systems are generally not considered to be suitable for computer systems designed for OLTP purposes.

A RAID 4 architecture uses the same parity error correction concept of the RAID 3 architecture, but improves on the performance of a RAID 3 system with respect to random reading of small files by "uncoupling" the operation of the individual disk drive actuators, and reading and writing a larger minimum amount of data (typically, a disk sector) to each disk (this is also known as block stripping). A further aspect of the RAID 4 architecture is that a single storage unit is designated as the parity unit.

A limitation of a RAID 4 system is that Writing a data block on any of the independently operating data storage units also requires writing a new parity block on the parity unit. The parity information stored on the parity unit must be read and XOR'd with the old data (to "remove" the information content of the old data), and the resulting sum must then be XOR'd with the new data (to provide new parity information). Both the data and the parity records then must be rewritten to the disk drives. This process is commonly referred to as a "Read-Modify-Write" sequence.

Thus, a Read and a Write on the single parity unit occurs each time a record is changed on any of the data storage units covered by the parity record on the parity unit. The parity unit becomes a bottle-neck to data writing operations since the number of changes to records which can be made per unit of time is a function of the access rate of the parity unit, as opposed to the faster access rate provided by parallel operation of the multiple data storage units. Because of this limitation, a RAID 4 system is generally not considered to be suitable for computer systems designed for OLTP purposes. Indeed, it appears that a RAID 4 system has not been implemented for any commercial purpose.

A RAID 5 architecture uses the same parity error correction concept of the RAID 4 architecture and independent actuators, but improves on the writing performance of a RAID 4 system by distributing the data and parity information across all of the available disk drives. Typically, "N+1" storage units in a set (also known as a "redundancy group") are divided into a plurality of equally sized address areas referred to as blocks. Each storage unit generally contains the same number of blocks. Blocks from each storage unit in a redundancy group having the same unit address ranges are referred to as "stripes". Each stripe has N blocks of data, plus one parity block on one storage unit containing parity for the remainder of the stripe. Further stripes each have a parity block, the parity blocks being distributed on different storage units. Parity updating activity associated with every modification of data in a redundancy group is therefore distributed over the different storage units. No single unit is burdened with all of the parity update activity.

For example, in a RAID 5 system comprising 5 disk drives, the parity information for the first stripe of blocks may be written to the fifth drive; the parity information for the second stripe of blocks may be written to the fourth drive; the parity information for the third stripe of blocks may be written to the third drive; etc. The parity block for succeeding stripes typically "precesses" around the disk drives in a helical pattern (although other patterns may be used).

Thus, no single disk drive is used for storing the parity information, and the bottleneck of the RAID 4 architecture is eliminated. An example of a RAID 5 system is described in U.S. Pat. No. 4,761,785 to Clark et al.

As in a RAID 4 system, a limitation of a RAID 5 system is that a change in a data block requires a Read-Modify-Write sequence comprising two Read and two Write operations: the old parity block and old data block must be read and XOR'd, and the resulting sum must then be XOR'd with the new data. Both the data and the parity blocks then must be rewritten to the disk drives. While the two Read operations may be done in parallel, as can the two Write operations, modification of a block of data in a RAID 4 or a RAID 5 system still takes substantially longer then the same operation on a conventional disk. A conventional disk does not require the preliminary Read operation, and thus does have to wait for the disk drives to rotate back to the previous position in order to perform the Write operation. The rotational latency time alone can amount to about 50% of the time required for a typical data modification operation. Further, two disk storage units are involved for the duration of each data modification operation, limiting the throughput of the system as a whole. Despite the Write performance penalty, RAID 5 type systems have become increasingly popular, since they provide high data reliability with a low overhead cost for redundancy, good Read performance, and fair Write performance.

Although different RAID systems have been designed, to date, such systems are rather inflexible, in that only one type of redundant configuration is implemented in each design. Thus, for example, redundant array storage systems have generally been designed to be only a RAID 3 or only a RAID 5 system. When the principal use of a redundant array storage system is known in advance, such rigidity of design may not pose a problem. However, uses of a storage system can vary over time. Indeed, a user may have need for different types of RAID systems at the same time, but not have the resources to acquire multiple storage systems to meet those needs. As importantly, different users have different needs; designing redundant array storage systems with different RAID configurations to meet such disparate needs is expensive.

It thus would be highly desirable to have a flexible RAID-architecture storage system in which the basic redundancy configuration could be altered for each user, or as a user's needs change. It would also be desirable to have a flexible RAID-architecture storage system in which different types of redundancy configuration can be simultaneously implemented.

The present invention provides such a system.

SUMMARY OF THE INVENTION

The RAID architecture of the present invention is extremely flexible, and permits a redundant array storage system to be configured as a RAID 1, 3, 4, or 5 system, or any combination of these configurations. The invention comprises a configuration data structure for addressing a redundant array storage system, and a method for configuring a redundant array storage system during an initialization process.

The redundant array storage system comprises a set of physical storage units which are accessible in terms of block numbers (a block comprises one or more sectors). As part of the initialization process, the physical storage units are each configured as one or more logical storage units. Each logical storage unit is addressed in terms of a channel number, storage unit number, starting block number, and offset number (the number of blocks to be transferred is also specified when doing transfers).

Once logical storage units are defined, logical volumes are defined as one or more logical storage units, each logical volume having a depth characteristic.

After the logical volumes are defined, redundancy groups are defined as one or more logical volumes. In the present invention, a redundancy level is specified for each redundancy group. The redundancy level may be none, one (e.g., XOR parity or an error-correction code, such as a Reed-Solomon code), or two (e.g., XOR parity plus a Reed-Solomon error-correction code).

Alternatively, redundancy groups are defined as one or more logical storage units, and logical volumes are defined as a member of a redundancy group.

Logical volumes are addressed by a host CPU by volume number, initial block number and number of blocks to be transferred. The host CPU also specifies a READ or WRITE operation. The specified volume number, initial block number, and number of blocks to be transferred are then translated into a corresponding channel number, storage unit number, starting block number, offset number, and number of blocks to be transferred.

With the present invention, it is possible for a logical volume to span across physical storage units ("vertical partitioning", comprise only a portion of each such physical storage unit ("horizontal partitioning"), and have definable depth and redundancy characteristics.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 2A is a diagram of a model RAID system, showing a typical physical organization.

FIG. 2B is a diagram of a model RAID system, showing a logical organization of the physical array of FIG. 2A, in which each physical storage unit is configured as two logical storage units.

FIG. 2C is a diagram of a model RAID system, showing a logical volume having a depth of one block.

FIG. 2D is a diagram of a model RAID system, showing a first logical volume having a depth of four blocks, and a second logical volume having a depth of one block.

FIG. 2E is a diagram of a model RAID system, showing a logical volume having a depth of one block, and one level of redundancy.

FIG. 2F is a diagram of a model RAID system, showing a logical volume having a depth of one block, and two levels of redundancy.

FIG. 3A is a diagram of a first data structure defining a redundancy group in accordance with the present invention.

FIG. 3B is a diagram of a second data structure defining a pair of redundancy groups in accordance with the present invention.

Like reference numbers and designations in the drawings refer to like elements.

DETAILED DESCRIPTION OF THE INVENTION

Figure 1:
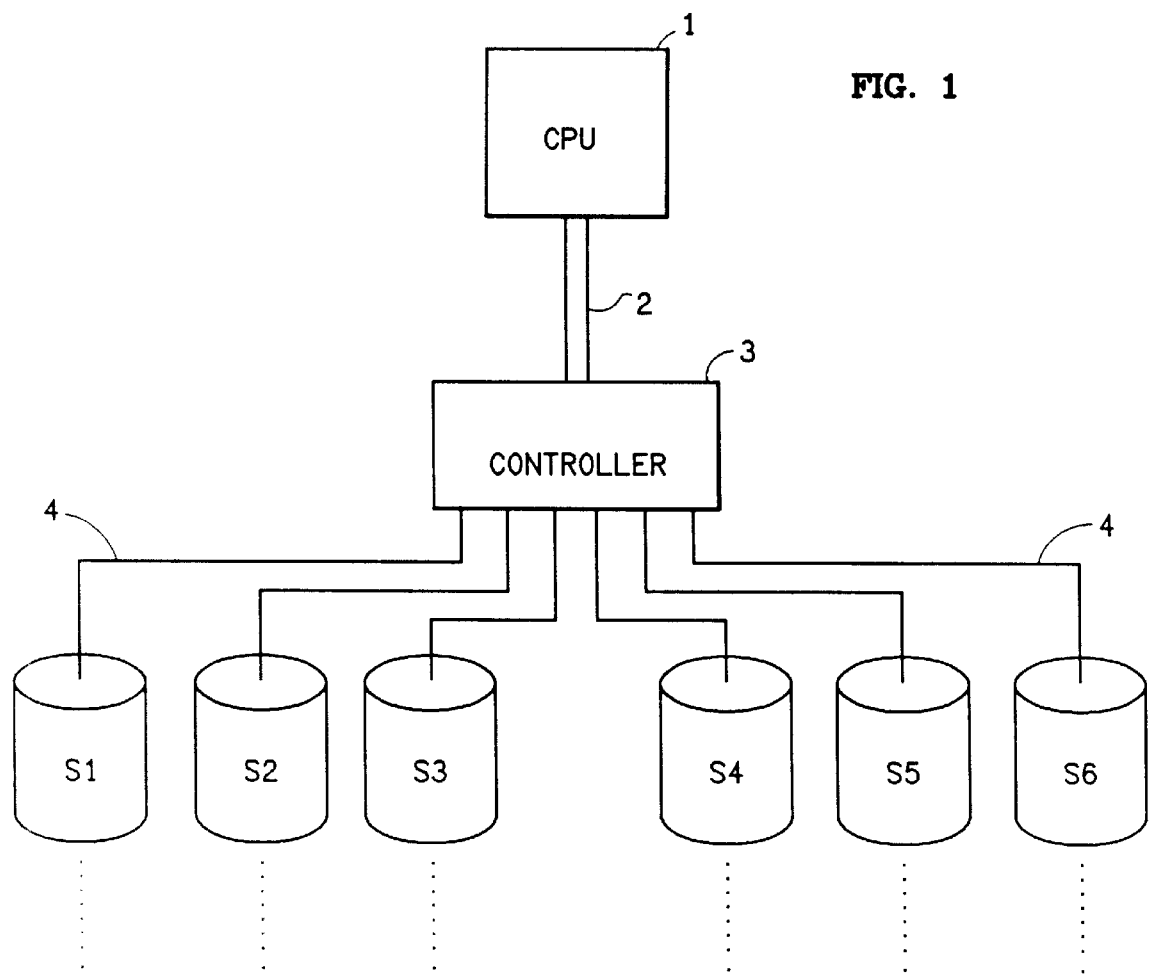
FIG. 1 is block diagram of a generalized RAID system in accordance with the present invention.

Throughout this description, the preferred embodiment and examples shown should be considered as exemplars, rather than limitations on the method of the present invention.

The invention comprises a group of one or more physical storage units and a set of logical structures that are "mapped" onto the physical storage units to determine how the physical storage units are accessed by a host CPU.

Physical Storage Units

A typical physical storage unit, such as a magnetic or optical disk drive, comprises a set of one or more rotating disks each having at least one read/write transducer head per surface. Data storage areas known as tracks are concentrically arranged on the disk surfaces. A disk storage unit may have, for example, 500 to 2000 tracks per disk surface. Each track is divided into numbered sectors that are commonly 512 bytes in size. Sectors are the smallest unit of storage area that can be accessed by the storage unit (data bits within a sector may be individually altered, but only by reading an entire sector, modifying selected bits, and writing the entire sector back into place). A disk storage unit may have 8 to 50 sectors per track, and groups of tracks may have differing numbers of sectors per track on the same disk storage unit (e.g., smaller circumference inner tracks may have fewer sectors per track, while larger circumference outer tracks may have more sectors per track).

Access to a sector ultimately requires identification of a sector by its axial displacement along the set of rotating disks, radial displacement on a disk, and circumferential displacement around a disk. Two common schemes are used for such identification. One scheme identifies a sector by a surface or head number (axial displacement), a track number (radial displacement), and a sector number (circumferential displacement). The second scheme treats all of the tracks with the same radius on all disks as a "cylinder" with tracks being subsets of a cylinder rather than of a surface. In this scheme, a sector is identified by a cylinder number (radial displacement), a track number (axial displacement), and a sector number (circumferential displacement). The present invention can be implemented using either form of physical identification.

It is possible for a higher level storage controller (or even the CPU) to keep track of the location of data on a storage unit by tracking all involved sectors. This is commonly done with magnetic disk drives following the well-known ST-506 interface standard used in personal computers. Storage units addressed in this manner are known as sector-addressable.

However, it is inconvenient in modern computer systems for a high-level storage controller to keep track of sector addresses by either of the addressing schemes described above. Therefore, in the preferred embodiment of the invention, an alternative form of storage unit addressing is used that maps the sectors of a storage unit to a more tractable form.

This mapping is accomplished by treating one or more sectors as a block, as is known in the art, and addressing each storage unit by block numbers. A block on the storage units used in the preferred embodiment of the inventive system can vary from 512 bytes up to 4096 bytes, but may be of any size (although commonly block sizes are limited to multiples of two bytes, for ease of implementation). The storage units being used must support the specified block size. In addition, such storage units mark defective sectors in such a way that they are not used to form blocks. (Some storage units can also dynamically "map out" defective blocks during operation in order to always present to external devices a set of contiguously numbered blocks). Each storage unit is then considered by a higher level controller to be a "perfect" physical device comprising a set of contiguously numbered logical blocks. Such units are known as block-addressable.

For example, with storage units having a Small Computer System Interface ("SCSI"), each storage unit is considered to be a contiguous set of blocks. An access request to such a unit simply specifies the numbers of the blocks that are to be accessed. Alternatively, the access request specifies the number of a starting block and the number of subsequent logically contiguous blocks to be accessed. Thereafter, the SCSI controller for the unit translates each block number either to a cylinder, track, and sector number format, or to a head, track, and sector number format. However, this translation is transparent to the requesting device.

It should be understood that the inventive concept can be applied to sector-addressable storage units. However, the preferred embodiment of the invention uses block-addressable storage units. The present invention then creates a first logical structure to map a plurality of such units to define a basic disk array architecture.

The First Logical Level of Addressing the Array

FIG. 1 is diagram of a generalized RAID system in accordance with the present invention. Shown are a CPU 1 coupled by a bus 2 to at least one array controller 3. The array controller 3 is coupled by I/O channels 4 (e.g., SCSI buses) to each of a plurality of storage units S0–S5 (six being shown by way of example only). Each I/O channel 4 is capable of supporting a plurality of storage units, as indicated by the dotted lines in FIG. 1. In some physical configurations, a second array controller 3' (not shown) can be coupled to the I/O channels 4 in parallel with the array controller 3, for added redundancy. The array controller 3 preferably includes a separately programmable, multi-tasking processor (for example, the MIPS R3000 RISC processor, made by MIPS Corporation of Sunnyvale, Calif.) which can act independently of the CPU 1 to control the storage units.

Figures 2A, 2B:
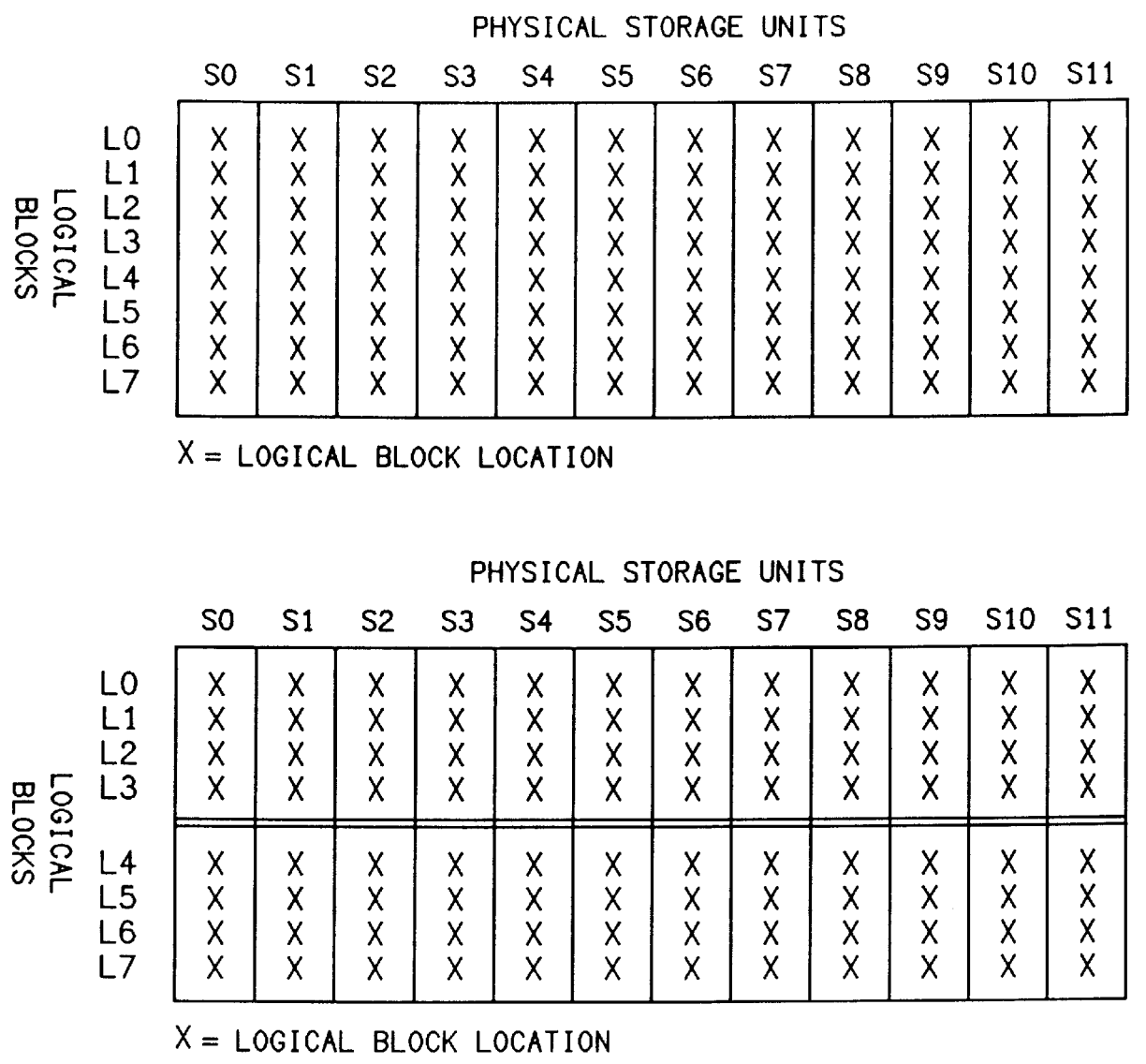

FIG. 2A shows a plurality of storage units S0–S11 (twelve being shown by way of example only) each having (for example) eight logical blocks L0–L7. To be able to access individual blocks in this array structure, the present invention imposes a first level of logical configuration on the array by establishing a data structure that specifies where data resides on the physical storage units. As part of an initialization process executed in the controller 3 or in the CPU 1, the physical storage units of the array described above are each configured as one or more Logical Storage Units. The data structure defines each Logical Storage Unit in the following terms:

(1) Channel Number. In the example of FIG. 2A, the channels are buses (e.g., SCSI buses) that couple the physical storage units to the controller 3. The channels correspond to the twelve storage units S0–S11, and are numbered 0–11.

(2) Storage Unit Number. Each physical storage unit along a channel is numbered by position starting at 2 and ending at 7 in the illustrated embodiment. Thus, each channel can handle up to six storage units (since the two controllers 3, 3' use two of the eight addresses available on a SCSI bus). However, this maximum number is based upon using the SCSI standard for the I/O channels 4 and having two array controllers 3, 3'. Other configuration limits are applicable when using other I/O channel architectures.

(3) Starting Block Number. This is the starting block number on the storage unit for each Logical Storage Unit. Normally, a physical storage unit starts numbering blocks at 0. However, since each physical storage unit can have multiple Logical Storage Units, setting the Starting Block Number for each Logical Storage Unit assures that the address spaces for the Logical Storage Units do not overlap.

(4) Number of Blocks. This is the total number of blocks in a respective Logical Storage Unit. Blocks are numbered sequentially beginning at the Starting Block Number and continuing for the total Number of Blocks.

In addition, the CPU 1 may select either controller 3, 3' to access a storage unit, so a Controller Number is also specified during processing. In the example of FIG. 2A, the primary array controller 3 is number 0, and the optional redundant array controller 3', if installed, is number 1. If a storage system is designed to have only a single array controller, this number is unnecessary. In the preferred embodiment, the Controller Number is selected dynamically by the CPU 1.

With this addressing hierarchy, a Logical Storage Unit cannot span physical storage units. However, one physical storage unit comprises at least one Logical Storage Unit, and may comprise several Logical Storage Units. Using this data structure, a block within a Logical Storage Unit can be located by knowing only its offset from the Starting Block Number.

As an example, FIG. 2B shows the twelve physical storage units of FIG. 2A defined as twenty-four Logical Storage Units. Each of the physical storage units S0–S11 are defined as two Logical Storage Units. The first Logical Storage Unit of each physical storage unit comprises blocks L0–L3, while the second Logical Storage Unit comprises blocks L4–L7.

As another example, a physical storage unit comprising 20,000 blocks may be configured as two Logical Storage Units of 10,000 blocks each, or four Logical Storage Units of 5,000 blocks each, or one Logical Storage Unit of 10,000 blocks and two Logical Storage Units of 5,000 blocks. However, two physical storage units of 20,000 blocks each could not be configured as one Logical Storage Unit of 40,000 blocks.

Using only the first level of logical addressing, the controller 3 can access any block on any storage unit in the array shown in FIG. 1. However, this format of addressing alone does not permit organizing the storage units into the flexible configuration RAID architecture of the present invention. A second level of logical addressing is required. This second logical level results in the CPU 1 addressing the array as Logical Volumes comprising a contiguous span of logical blocks in Logical Storage Units. Addressing of the array at the first logical level is completely handled by the controller 3, and is totally transparent to the CPU 1.

The Second Logical Level of Addressing the Array

In the second level of logical addressing, a Logical Volume is defined as one or more Logical Storage Units. The number of Logical Storage Units in a Logical Volume defines the width of striping to be used by the Logical Volume. Data blocks are always striped across a Logical Volume starting at the first Logical Storage Unit in the Logical Volume. All of the Logical Storage Units in a Logical Volume are defined to have the same block size and capacity.

In FIG. 2C, the twelve physical storage units of FIG. 2A have been defined as twelve Logical Storage Units grouped into two Logical Volumes of six Logical Storage Units each (any other configuration coming within the above-described limitations could also be selected). The striping width of both Logical Volumes in this example is six.

The striping order for a Logical Volume has an associated "depth". The depth defines how many data blocks are consecutively written to a single Logical Storage Unit before writing to the next Logical Storage Unit in the Logical Volume. For example, in FIG. 2C, there are six Logical Storage Units S0–S5 in Logical Volume #0, and the Logical Volume has a depth of one block. In terms of addressing requests from the CPU 1, logically block numbering of Logical Volume #0 begins with the first logical block 0 being block L0 of Logical Storage Unit S0. The second logical block 1 is block L0 of Logical Storage Unit S1, and so on. Logical Volume #1 is shown as being defined with the same logical structure, but this is not necessary, as explained in greater detail below.

FIG. 2D shows another configuration example for Logical Volume #0, but with a depth of four blocks. The first four numbered logical blocks are consecutive blocks on Logical Storage Unit S1; the next four numbered logical blocks are consecutive blocks on Logical Storage Unit S1, and so on. When operating in an On-Line Transaction Processing (OLTP) RAID 4 or RAID 5 mode, there is a significant advantage to using a depth that matches the page size (if appropriate) of the CPU operating system. For example, if requests from the CPU 1 are always on a four-block boundary and are made in multiples of four blocks, it is possible to have all six Logical Storage Units of Logical Volume #0 processing a separate request (assuming there are enough requests to have one available for each Logical Storage Unit).

In contrast, in the configuration of Logical Volume #0 shown in FIG. 2C, four Logical Storage Units would be involved when a four-block request was made. While the configuration of FIG. 2C would allow RAID 3-type parallelism, the head seek time and latency time for random access to four blocks would far outweigh the time required to transfer four blocks of data in the configuration of FIG. 2D (the time to transfer four blocks being only marginally greater than the time to transfer one block).

The second level of logical addressing forms the framework that the CPU 1 uses to communicate with the storage array. Input/Output requests from the CPU 1 are made by specifying a Logical Volume, an initial logical block number, and the number of blocks. With this information, the controller 3 accesses the data structure for the indicated Logical Volume and determines which Logical Storage Unit(s) contains the requested data blocks. This is accomplished by comparing the initial logical block number with the sizes (from the Number of Blocks parameter) of the Logical Storage Units comprising the Logical Volume. Thus, if a Logical Volume comprises 6 Logical Storage Units each 20,000 blocks in size, and the requested initial logical block number is for block 63,000, that block will be on the fourth Logical Storage Unit, at an Offset Number of 3,000 blocks. After determining the proper Logical Storage Unit and the Offset Number, the request is mapped to a respective Channel Number, Storage Unit Number, and Starting Block Number. The request further includes the offset from the Starting Block Number, and the number of blocks to be transferred. In this example, the desired initial logical block number is at an Offset Number of 3,000 blocks from the mapped Starting Block Number of the fourth Logical Storage Unit. Such mapping is carried out in known fashion.

With the present invention, it is possible to change the size of a Logical Volume without changing any applications. However, because the data is striped across the Logical Storage Units comprising a Logical Volume, it is necessary to "reformat" a Logical Volume after altering it (e.g., by adding or deleting physical storage units). Adding a physical storage unit is similar to replacing a smaller physical storage unit with a larger storage unit, except that the cost is incremental since the original physical storage units continue to be used as a part of the "larger" storage unit The present invention permits different Logical Volumes to have different depths. For example, in FIG. 2D, the twelve physical storage units of FIG. 2A have been defined as twelve Logical Storage Units grouped into two Logical Volumes of six Logical Storage Units each. Logical Storage Units S0–S5 comprise Logical Volume #0, the volume having a depth of four blocks, and Logical Storage Units S6–S11 comprise Logical Volume #1, the volume having a depth of one block.

The performance of an array is determined by the way the Logical Volumes are configured. For high input/output bandwidth use, it is better to spread the Logical Storage Units across multiple controllers to optimize parallel transfers. For OLTP mode (i.e., RAID 4 or 5), the larger the number of Logical Storage Units in a Logical Volume, the greater the number of concurrent transactions that may be handled (up to the point that the CPU 1 reaches its processing capacity). From a performance standpoint in the OLTP mode, striping across multiple channels to different physical storage units (each being accessible on independent I/O buses 4) is generally better than striping down a channel to additional physical storage units (where I/O requests for different physical storage units must share the same I/O bus 4).

Once Logical Volumes are defined, Redundancy Groups comprising one or more Logical Volumes are defined. (Alternatively, Redundancy Groups are defined as one or more Logical Storage Units, and Logical Volumes are defined as a member of a Redundancy Group. Either characterization results in the same basic data structure). A Logical Volume must be wholly contained in a Redundancy Group (if it is contained in any Redundancy Group). In the preferred embodiment of the invention, up to two levels of redundancy are supported. Each redundancy level allows one Logical Storage Unit in a Redundancy Group to fail without any loss of user data. Thus, one level of redundancy (called P redundancy) will allow one Logical Storage Unit per Redundancy Group to fail without loss of data, while two levels of redundancy (the second level is called Q redundancy) will allow two Logical Storage Units per Redundancy Group to fail without loss of data.

Each row of blocks in a Redundancy Group is called a Redundancy Row. Redundancy blocks are generated for the blocks in each Redundancy Row and stored in the respective Redundancy Row. Thus, each row will lose one or two blocks of data storage capacity (one for P and one for Q redundancy) due to the redundancy blocks. However, because the CPU 1 only "sees" Logical Volumes comprising an apparently contiguous span of logical blocks, this loss is transparent to the CPU 1 (except for the loss in total capacity of the Logical Storage Units in the Redundancy Group and a loss in bandwidth).

In the preferred embodiment, P redundancy blocks are computed by exclusive-OR'ing all data blocks in a Redundancy Row, in known fashion. In the preferred embodiment, Q redundancy blocks are computed by application of a Reed-Solomon encoding method to all data blocks in a Redundancy Row, in known fashion. However, other redundancy generation techniques can be applied in place of the preferred XOR and Reed-Solomon techniques. The generation of P and Q redundancy and recreation of user data after a failure is described in detail in U.S. patent application Ser. No. 270,713, filed Nov. 14, 1988, entitled "Arrayed Disk Drive System and Method" and commonly assigned with the present invention.

Redundancy Groups are calculated on a block-by-block basis. It is therefore possible to have multiple Logical Volumes having different depths but contained within the same Redundancy Group. Thus, for example, 6 Logical Storage Units of a 12-physical storage unit array can be defined as a Logical Volume with a RAID 3-like high bandwidth architecture (but with shared parity across the Redundancy Group) having a depth of four blocks, while the remaining 6 Logical Storage Units can be set up as a Logical Volume with a RAID 5-like OLTP architecture having a depth of one block (see, for example, FIG. 2D). A Write operation to Logical Volume #0 requires updating the associated parity block wherever that parity block resides in the Redundancy Group (i.e., in Logical Volume #0 or Logical Volume #1). Similarly, a Write operation to Logical Volume #1 requires an update to the corresponding parity block wherever it resides in the Redundancy Group. The difference in volume depths between the two Logical Volumes poses no problem because the parity blocks are updated on a block-by-block basis, and all volume depths are multiples of the block size.

Redundancy blocks are evenly distributed throughout a Redundancy Group so that their positions can be computed relative to the position of the data blocks requested by the CPU 1. Distributing the redundancy blocks also prevents the array from "serializing" on the Logical Storage Unit that contains the redundancy blocks when in the OLTP mode (i.e., distributed redundancy results in a RAID 5 architecture, while non-distributed redundancy results in a RAID 3 or 4 architecture).

FIG. 2E is a diagram of a model RAID system, showing a typical logical organization having a depth of one block, and one level of redundancy. Redundancy blocks are indicated by "P". FIG. 2F is a diagram of a model RAID system, showing a typical logical organization having a depth of one block, and two levels of redundancy. Redundancy blocks are indicated by "P" and "Q". Each Redundancy Group configured in a single array can have a different redundancy level, so the CPU 1 can vary the levels of redundancy for each Redundancy Group to suit reliability needs. Changing a Redundancy Group (adding or deleting Logical Volumes or changing the redundancy level), requires a "reformat" operation (which may be done dynamically, i.e., without halting normal access operations).

It should be noted that the particular pattern of distributing redundancy blocks shown in FIGS. 2E and 2F are exemplary only, and that other patterns of distribution are within the scope of this invention.

Even when the depth of a Logical Volume is greater than one, the generation of P and Q redundancy blocks is based on the blocks in the same row. When choosing the level of redundancy (0, 1, or 2), it is necessary to weigh the level of reliability necessary. It is also necessary to determine how much storage space to sacrifice. The larger the number of Logical Storage Units there are in a Redundancy Group, the smaller the amount of total capacity lost to redundancy blocks. But the larger the size of a Redundancy Group, the higher the likelihood of a storage unit failure, and therefore the lower the reliability of the Redundancy Group. When correcting data due to storage unit failures, it is necessary to reread entire Redundancy Rows, so the larger the Redundancy Group, the slower the response to I/O requests to a Redundancy Group that has a storage unit failure. The larger the Redundancy Group, the better the overall performance may be in an OLTP mode, simply because there are more transducer heads involved and a lower ratio of redundancy blocks to data blocks.

FIG. 3A is a representation of a data structure for the array shown in FIG. 2C, with a single Redundancy Group (#0) defined as comprising two Logical Volumes (#0 and #1). FIG. 3B is a representation of a data structure for the same array, but with two Redundancy Groups (#0 and #1) defined, respectively comprising Logical Volume #0 and Logical Volume #1. With this data structure, an I/O request from the CPU 1 is stated in terms of a Logical Volume, an initial logical block number, and the number of blocks. With this information, the controller 3 accesses the data structure for the indicated Logical Volume and determines which Logical Storage Unit(s) contains the requested data blocks. As noted above, this is accomplished by comparing the initial logical block number with the sizes (from the Number of Blocks parameter) of the Logical Storage Units comprising the Logical Volume. After determining the proper Logical Storage Unit and the Offset Number, the request is mapped to a respective Channel Number, Storage Unit Number, and Starting Block Number. The request further includes the offset from the Starting Block Number, and the number of blocks to be transferred. These parameters permit the addressing of a physical storage unit to access the requested data blocks.

SUMMARY

In summary, a redundant array storage system comprising a set of block-addressable physical storage units is configured during an initialization process. Each physical storage unit is independently defined as comprising one or more Logical Storage Units addressable in terms of a Channel Number, Storage Unit Number, Starting Block Number, Offset Number, and number of blocks to be transferred. Logical Volumes are then independently defined as one or more Logical Storage Units, each Logical Volume having an independently definable depth characteristic. Redundancy Groups are then independently defined as one or more Logical Volumes, each Redundancy Group having an independently definable redundancy level. The redundancy level may be none, one (e.g., XOR parity or an error-correction code, such as a Reed-Solomon code), or two (e.g., XOR parity plus, for example, a Reed-Solomon error-correction code). (Alternatively, Redundancy Groups are defined as one or more Logical Storage Units, and Logical Volumes are defined as a member of a Redundancy Group).

Logical Volumes are addressed by a host CPU 1 by Volume Number, initial block number, and number of blocks to be transferred. The CPU 1 also specifies a READ or WRITE operation. The CPU 1 sends the access request to a selected controller 3, 3', which then translates the specified Volume Number, initial block number, and number of blocks to be transferred into a corresponding Channel Number, Storage Unit Number, Starting Block Number, Offset Number, and number of blocks to be transferred.

Using the logical organization and method of storage unit access of the present invention, different RAID architectures can be concurrently supported using the same physical storage units. Thus, for example, the 12 Logical Disks shown in FIG. 2D can be configured into (1) a Logical Volume #0 with a width of 6 Logical Disks and a depth of four blocks and operated in a RAID 3 mode (high I/O bandwidth), and (2) a Logical Volume #1, with a width of 6 Logical Disks and a depth of one block and operated in a RAID 5 mode (On-Line Transaction Processing).

The present invention is therefore extremely flexible, and permits a redundant array storage system to be configured as a RAID 1, 3, 4, or 5 system, or any combination of these configurations. In the present invention, it is thus possible for a Logical Volume to span across physical storage units ("vertical partitioning"), comprise only a portion of each such physical storage unit ("horizontal partitioning"), and have definable depth and redundancy characteristics.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A storage subsystem for use in conjunction with a system central processing unit that issues data requests to said storage subsystem, said data requests being mapped by said system central processing unit to respective addresses that appear to said system central processing unit to be addressed within said storage subsystem, comprising:

a plurality of physical data storage units that are accessible in terms of block numbers and configured as one or more logical storage units, wherein the logical storage units are dynamically configurable into two or more logical volumes, wherein each of said logical volumes comprises a subset of said plurality of physical data storage units, and wherein each of said two or more logical volumes may be configured as separate redundancy groups; and a storage controller for remapping a specified logical volume, an initial block volume, and a number of blocks mapped by said system central processing unit to actual addresses within said storage subsystem for accessing data structures of the logical volumes transparent to the system central processing unit.

2. The storage subsystem of claim 1 wherein said separate redundancy groups comprise at least two redundancy groups having substantially equivalent RAID levels.

3. The storage subsystem of claim 1 wherein said separate redundancy groups comprise at least two redundancy groups having differing RAID levels.

4. The storage subsystem of claim 1 wherein said two or more logical volumes are configurable at initialization of said storage subsystem.

5. The storage subsystem of claim 1 wherein said two or more logical volumes are configurable at a time when normal access operations are not in progress.

6. The storage subsystem of claim 1 wherein said two or more logical volumes are configurable without halting normal access operations.

7. A method for dynamically configuring a storage subsystem comprising a storage controller coupling a plurality of physical data storage units to a host central processing unit, said method comprising the steps of:

configuring each of the physical data storage units as one or more logical storage units; partitioning at least some of said logical storage units into two or more logical volumes;

configuring each of said two or more logical volumes as separate redundancy groups;

receiving from said host central processing unit a specified logical volume, an initial block volume, and a number of blocks which has been mapped by said host central processing unit into a host address directed to said storage subsystem;

remapping said host address to an address within said logical volumes; and using said remapped address, accessing data structures of the logical volumes transparently to said host central processing unit.

8. The method of claim 7 wherein said step of partitioning is carried out by the step of:

logically segregating said plurality of physical data storage units into a number of subsets thereof, each of said subsets corresponding to one of said two or more logical volumes.

9. The method of claim 7 wherein said step of configuring is carried out by the step of:

defining at least two of said logical volumes as redundancy groups having substantially equivalent RAID levels.

10. The method of claim 7 wherein said step of configuring is carried out by the step of:

defining at least two of said logical volumes as redundancy groups having differing RAID levels.

11. The method of claim 7 wherein said step of configuring is carried out at initialization of said storage subsystem.

12. The method of claim 7 wherein said step of configuring is carried out when normal access operations are not in progress.

13. The method of claim 7 wherein said step of configuring is carried out without halting normal access operations.

* * * * *